United States Patent
Kim (10) Patent No.: US 12,459,406 B2
(45) Date of Patent: Nov. 4, 2025

(54) BRAKE DEVICE FOR VEHICLE SEAT

(71) Applicant: DAS CO., LTD, Gyeongju-si (KR)

(72) Inventor: Jae Ho Kim, Suwon-si (KR)

(73) Assignee: DAS CO., LTD., Gyeongju-si (KR)

( * ) Notice: Subject to any disclaimer, the term of this patent is extended or adjusted under 35 U.S.C. 154(b) by 404 days.

(21) Appl. No.: 18/085,907

(22) Filed: Dec. 21, 2022

(65) Prior Publication Data

US 2023/0264608 A1      Aug. 24, 2023

(30) Foreign Application Priority Data

Feb. 21, 2022   (KR) .................. 10-2022-0022141

(51) Int. Cl.
*B60N 2/16*          (2006.01)
(52) U.S. Cl.
CPC ........... *B60N 2/168* (2013.01); *B60N 2/1615* (2013.01); *B60N 2/167* (2013.01)
(58) Field of Classification Search
CPC ....... B60N 2/168; B60N 2/1615; B60N 2/167
See application file for complete search history.

(56) References Cited

U.S. PATENT DOCUMENTS

| 2019/0210489 | A1 | 7/2019 | Sato |
| 2020/0086771 | A1 | 3/2020 | Kanazawa |
| 2024/0416804 | A1* | 12/2024 | Kim ................ B60N 2/168 |

FOREIGN PATENT DOCUMENTS

| CN | 109642625 A | 4/2019 |
| JP | 2018086976 A | 6/2018 |
| KR | 1020210067586 A | 6/2021 |

OTHER PUBLICATIONS

German Office Action for DE patent application No. 10 2022 214 280.2, dated Feb. 2, 2024, 5 pages.
Examination Report for IN application No. 202244075439, dated Jul. 9, 2025, 6 pages.

* cited by examiner

*Primary Examiner* — David R Morris
(74) *Attorney, Agent, or Firm* — Tarolli, Sundheim, Covell & Tummino LLP (57) ABSTRACT

A brake device for a vehicle seat, which includes a tooth plate installed on an unlock member and coupled to a pinion shaft in a serration manner to constrain rotation of the pinion shaft. Therefore, even when the rotational constraint force by brake rollers is reduced due to the repeated loading, the rotation of the pinion shaft is reliably suppressed by the tooth plate, thereby preventing seat sagging.

7 Claims, 9 Drawing Sheets

“BRAKE DEVICE FOR VEHICLE SEAT

CROSS REFERENCE TO RELATED APPLICATION

The present application claims priority to Korea Patent Application No. 10-2022-0022141, filed Feb. 21, 2022, the entire contents of which is incorporated herein for all purposes by this reference.

BACKGROUND

Field

The present disclosure relates to a brake device for a vehicle seat, and more particularly, to a brake device for a vehicle seat which maintains an adjusted height after the height of a seat cushion is adjusted.

Description of the Related Art

A seat brake device of a vehicle is installed on a seat cushion frame to enable a seat height adjustment mechanism to adjust the height of the seat by constraining or releasing the operation of a rack member which is a component of the seat height adjustment mechanism installed inside the seat cushion frame.

The seat brake device includes a pinion shaft having a pinion gear engaged with a rack gear of the rack member, maintains the height of the seat to be constant by constraining the rotation of the pinion shaft using a plurality of brake rollers, and enables the height of the seat to be adjusted through the operation of the seat height adjusting mechanism when an occupant operates a lever to release the constrained state of the pinion shaft due to the brake rollers.

However, in the conventional seat brake device, when a load is repeatedly applied by the weight of the occupant for a long period of time, a friction force between the pinion shaft and the brake rollers is reduced and the pinion shaft is rotated while slipping, resulting in a problem that the height of the seat (exactly the height of the seat cushion) is not firmly maintained to cause seat sagging downward.

SUMMARY

The present disclosure has been devised to solve the above problems, and an object of the present disclosure is to provide a brake device for a vehicle seat, capable of preventing the height of the seat from being lowered, that is, a seat sagging phenomenon by making rotation of a pinion shaft impossible even when the constraint force by the brake rollers for the pinion shaft is reduced in a brake lock state.

According to an embodiment of the present disclosure, a brake device for a vehicle seat includes an input member connected to a lever to be operated by an occupant and rotating according to operation of the lever, an unlock member configured to be pushed and moved in an axial direction by rotation of the input member, a housing, the input member and the unlock member being installed on one side of the housing, a brake ring mounted on the other side of the housing, a pinion shaft rotatably installed in the housing through the brake ring, a brake member installed between the brake ring and the pinion shaft and constraining the pinion shaft with respect to the brake ring or releasing constraint of the pinion shaft, and a tooth plate installed in the unlock member and constraining rotation of the pinion shaft.

Further, teeth formed on an inner peripheral surface of the tooth plate may be engaged with teeth formed on one end of the pinion shaft.

Further, the teeth of the tooth plate and the teeth of the pinion shaft may be mutually constrained in a circumferential direction and be freely separated from each other in the axial direction.

Further, the tooth plate may be inserted into the unlock member, an upper surface of the tooth place may be in close contact with an upper surface of an inner space of the unlock member, and a lower surface of the tooth place may be supported in contact with a second spring that elastically supports the unlock member in an opposite direction of the housing.

Further, a plurality of protrusions is formed on an outer peripheral surface of the tooth plate, and the protrusions are inserted into holding grooves formed on an inner peripheral surface of the unlock member to constrain the tooth plate in a rotational direction with respect to the unlock member.

Further, a guide protrusion formed on an intermediate wall of the housing in the axial direction may be inserted into a guide groove formed in an outer peripheral surface of the unlock member in the axial direction, so that the unlock member is constrained in a rotational direction with respect to the housing.

Further, when the lever is operated and the unlock member moves toward the housing by the input member, the tooth plate may move together with the unlock member, so that the teeth of the pinion shaft and the teeth of the tooth plate are separated from each other to enable the pinion shaft to rotate freely.

BRIEF DESCRIPTION OF THE DRAWINGS

FIGS. 8 and 9 are partially cut-away perspective views of a seat brake device according to the present disclosure, FIG. 8 is a view showing a state in which a lever is not operated, and FIG. 9 is a view showing a state in which the lever is operated.

DETAILED DESCRIPTION

The present disclosure may be variously modified and may have various embodiments, and particular embodiments illustrated in the drawings will be described in detail below. However, the description of the exemplary embodiments is not intended to limit the present disclosure to the particular exemplary embodiments, but it should be understood that the present disclosure is to cover all modifications, equivalents and alternatives falling within the spirit and technical scope of the present disclosure. Thicknesses of lines illustrated in the accompanying drawings, sizes of constituent elements, or the like may be exaggerated for clarity and convenience of description.

In addition, the terms used below are defined in consideration of the functions in the present disclosure and may vary depending on the intention of a user or an operator or precedents. Therefore, the definition of the terms should be made based on the entire contents of the present specification.

Hereinafter, preferred embodiments according to the present disclosure will be described in detail with reference to the accompanying drawings.

Figure 1:
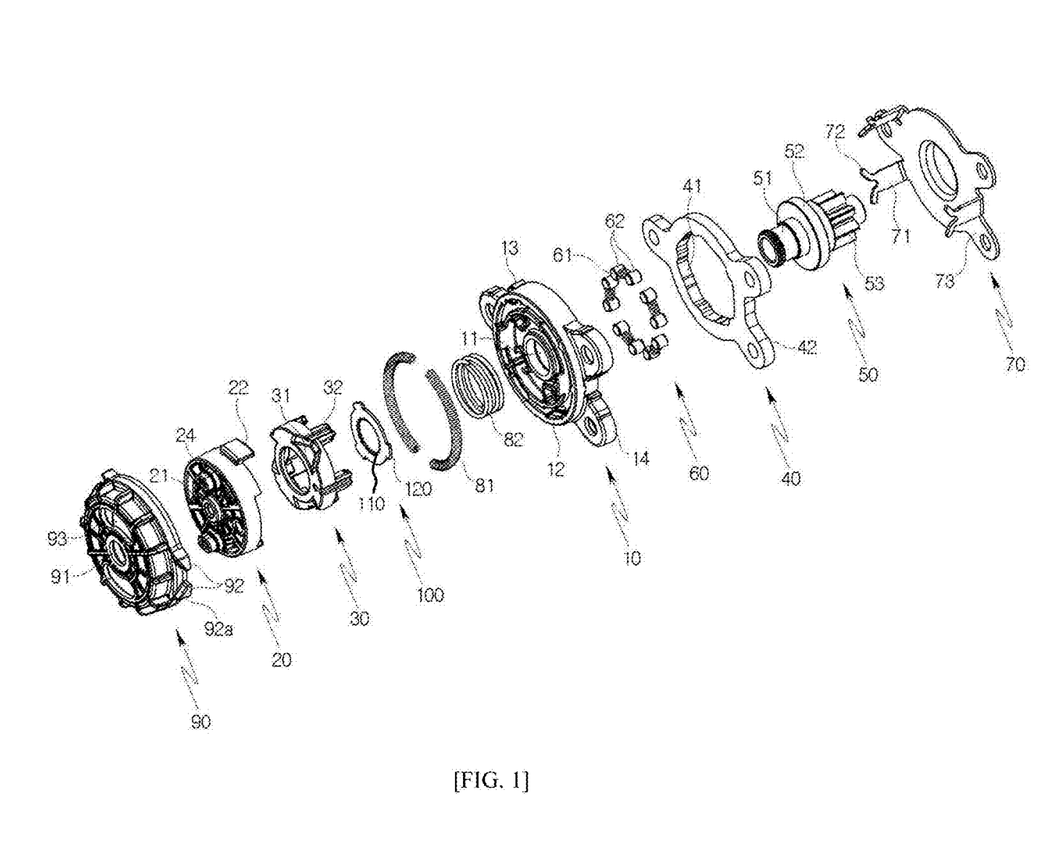
FIG. 1 is an exploded perspective view of a brake device for a vehicle seat according to the present disclosure.
Figure 2:
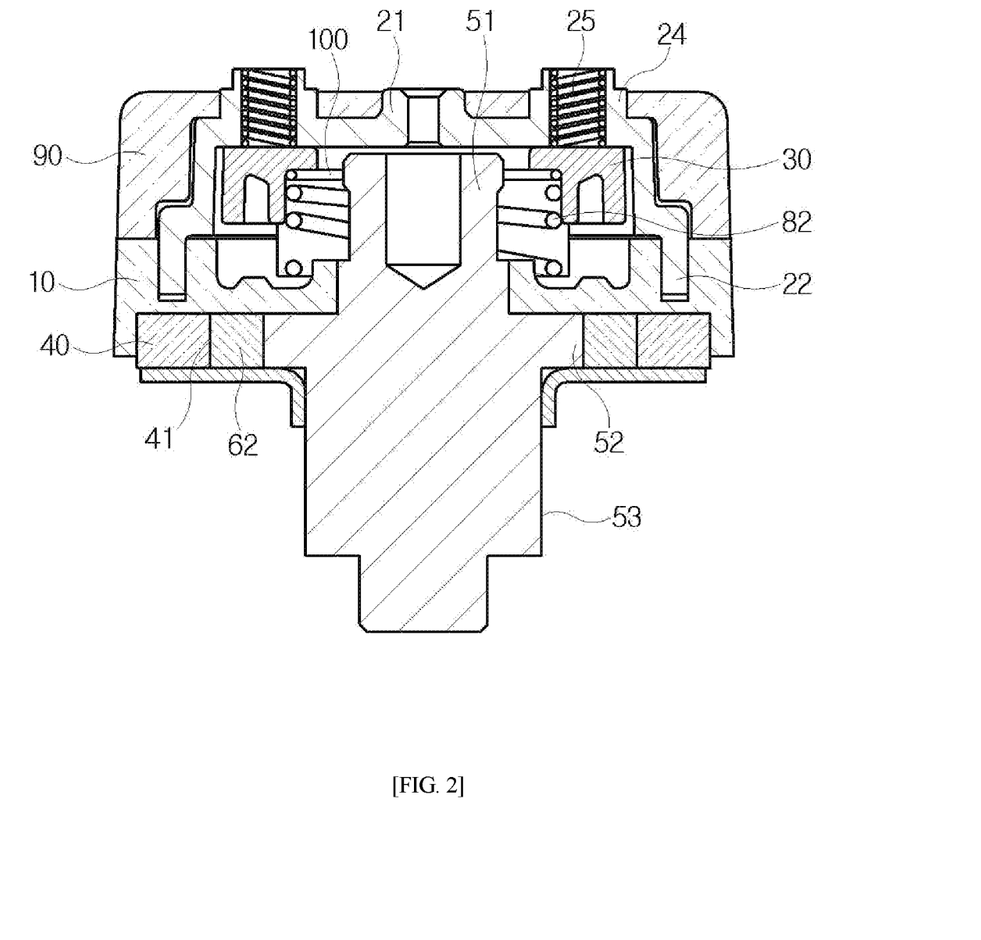
FIG. 2 is a cross-sectional view of the assembled state of FIG. 1.
Figure 3:
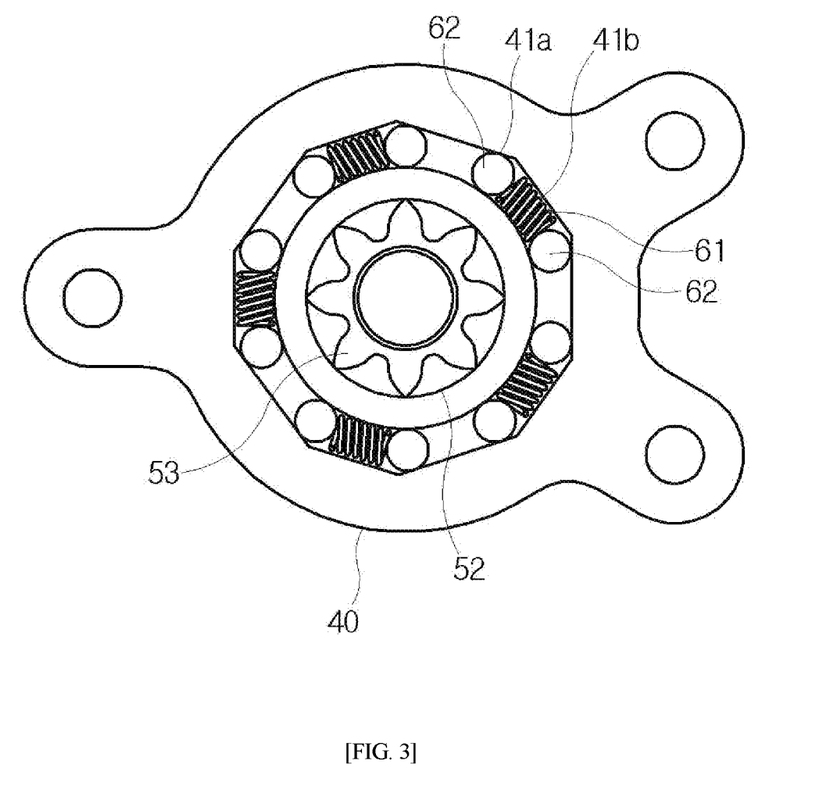
FIG. 3 is a bottom view of FIG. 2 in which a plate cover is removed.

Referring to FIGS. 1 to 3, a brake device for a vehicle seat according to the present disclosure may include a housing 10, an input member 20, an unlock member 30, a brake ring 40, a pinion shaft 50, a braking member 60, a cover plate 70, a cover 90, and a tooth plate 100.

On one side of the housing 10, a release operation portion is configured by the input member 20, the unlock member 30, and the like, and on the other side of the housing 10, a break portion is configured by the brake ring 40, the pinion shaft 50, the braking member 60, and the like.

The release operation portion may serve to release a lock state of the brake portion according to the operation of a lever (not shown) operated by a user, and the brake portion may serve to maintain a lock state against the user's weight and the operation of a seat height adjustment mechanism to maintain the height of the seat which has been adjusted immediately before.

The cover plate 70 and the cover 90 are parts disposed on the outermost side of the brake device. The parts constituting the release operation portion and the brake portion may be accommodated between the cover plate 70 and the cover 90, which prevents the parts from deviating to the outside.

The input member 20, which is a substantially cylindrical part, is connected to a lever (not shown) operated by an occupant and is rotatably operated. A center boss 21 disposed in a center of the input member is inserted into a boss hole 91 of the cover 90 to maintain a rotational center. Holding portions 22 protrude from the other end of the input member 20 at opposite positions, respectively, and the holding portions 22 are positioned between first springs 81 installed in the housing 10. Therefore, the input member 20 may return to its original position by the first springs 81 after the rotational operation by the lever.

The unlock member 30 is inserted into the input member 20 and is axially operated in connection with the rotational operation of the input member 20. To this end, a trapezoidal sliding groove 31 is formed in the upper surface of the unlock member 30 (see FIG. 6), and correspondingly, a trapezoidal sliding protrusion (not shown) is formed on the inner peripheral surface of the input member 20. In an assembled state, the sliding protrusion is inserted into the sliding groove 31. Therefore, when the input member 20 is rotated, an inclined surface of the sliding protrusion and an inclined surface of the sliding groove 31 slip with each other, so that the unlock member 30 forwardly moves toward the housing 10 while compressing a second spring 82.

A plurality of unlock protrusions 32 are formed to protrude toward the housing 10 at regular intervals along the circumferential direction of the unlock member 30.

A cylindrical center boss 11 is formed to protrude from the front surface of the housing 10, and one end of the second spring 82 is held by tightening against the outer periphery of the center boss 11. In this state, the other end of the second spring 82 may elastically support the unlock member 30 (see FIG. 2).

The first springs 81 include a pair of left and right springs, and spring grooves 12 into which the first springs 81 are inserted and seated are formed in the front surface of the housing 10 in the circumferential direction. The ends of the first springs 81 are held by the holding portions 22 of the input member 20. When the input member 20 is rotated by operation of the lever, the first springs 81 are compressed, and when a lever operating force is removed, the input member 20 returns to its original position due to the restoring force of the first springs 81.

The brake ring 40 may define a space for installation and operation of the braking member 60 in combination with the pinion shaft 50.

The brake ring 40 is disposed in close contact with the other side (rear surface) of the housing 10, and includes wedge surfaces 41a and release surfaces 41b alternately and repeatedly formed in an inner peripheral surface 41 in the circumferential direction.

The pinion shaft 50 has a disk-shaped brake plate 52 formed at one side of the outer periphery of a shaft 51, and a pinion gear 53 is formed at one side of the brake plate 52. The pinion gear 53 may be engaged with the racks of the seat height adjustment mechanism.

One end of the shaft 51 of the pinion shaft 50 is inserted into and seated in a through hole of the center boss 11 of the housing 10 through the brake ring 40. In this case, the brake plate 52 of the pinion shaft 50 is positioned inside a through hole of the brake ring 40. Therefore, the space for the installation and operation of the braking member 60 may be formed between the inner peripheral surface 41 of the brake ring 40 and the outer peripheral surface of the brake plate 52 of the pinion shaft 50.

A plurality of braking members 60 are inserted into and installed in the space for the installation and operation of the braking member 60. One braking member 60 may include a spring 61 and rollers 62 disposed at both ends of the spring 61. The spring 61 is positioned in the center of the release surface 41b of the inner peripheral surface 41 of the brake ring 40 and the rollers 62 are positioned so as to be in contact with both ends of the spring 61.

In a normal state in which the lever is not operated by an occupant, the brake device is in a lock (locked) state in which the both rollers 62 are pushed by the spring 61 and fitted between the outer peripheral surface of the brake plate 52 and the wedge surface 41a. As described above, all the rollers 62 are positioned on the wedge surfaces 41a to fix the brake plate 52, thereby maintaining the state in which the pinion shaft 50 is unable to rotate.

The cover plate 70 is installed in close contact with the other side of the brake ring 40. The pinion gear 53 of the pinion shaft 50 protrudes to the opposite side through a through hole of the cover plate 70 and is engaged with the rack gear, and the brake plate 52 is axially held by the periphery of the through hole of the cover plate 70. Accordingly, the pinion shaft 50 is prevented from being separated from the braking member 60 by the cover plate 70.

Meanwhile, the cover 90 is installed on the front side of the input member 20. The cover 90 is a circular container-shaped part with one side closed, and the input member 20 is inserted into and seated in the cover 90.

The boss hole 91 which the center boss 21 of the input member 20 is inserted into and seated in is formed in the front of the cover 90.

A plurality of coupling pieces 71 are formed to bent and extended from the cover plate 70 toward the cover 90. Two caulking protrusions 72 are formed to protrude from the end of the coupling piece 71.

A pair of holding jaws 92 spaced apart from each other by the width of the coupling piece 71 are formed on the outer peripheral surface of the cover 90 in correspondence to the caulking protrusion 72, and the number of the pairs of holding jaws 92 is identical to the number of the coupling pieces 71. The pair of holding jaws 92 have holding surfaces 92a formed to be inclined to face each other.

Figure 4:
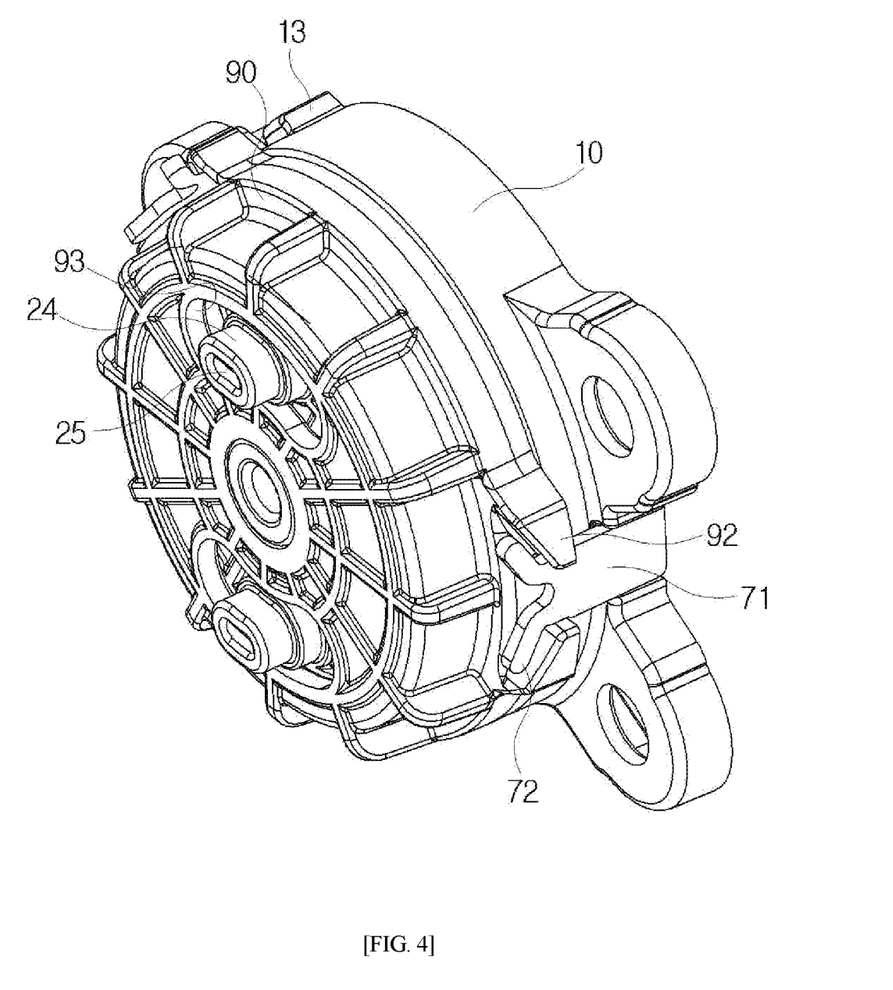
FIG. 4 is a front perspective view of a seat brake device according to the present disclosure.

After the assembly of the other parts is completed, the cover plate 70 and the cover 90 are pressed in the directions toward each other, and in this state, the caulking protrusions 72 are caulked and spread in opposite directions to each other to be held on the holding surfaces 92a of the holding jaws 92 of the cover 90 (see FIG. 4). The cover plate 70 is made of a metal material, and the caulking protrusions 72 are plastically deformed by caulking to be kept spread in the opposite directions, thus the caulking protrusions 72 being held on the holding surfaces 92a firmly and stably.

In this case, since the coupling piece 71 is inserted between the holding jaws 92 on both sides, the circumferential relative movement between the cover plate 70 and the cover 90 is also prevented. In addition, a protrusion 13 is also formed on the outer peripheral surface of the housing 10, so that the coupling piece 71 is held in the circumferential direction, thus allowing the housing 10, the cover plate 70 and the cover 90 to be tightly coupled to each other without movement in the circumferential direction.

Figure 5:
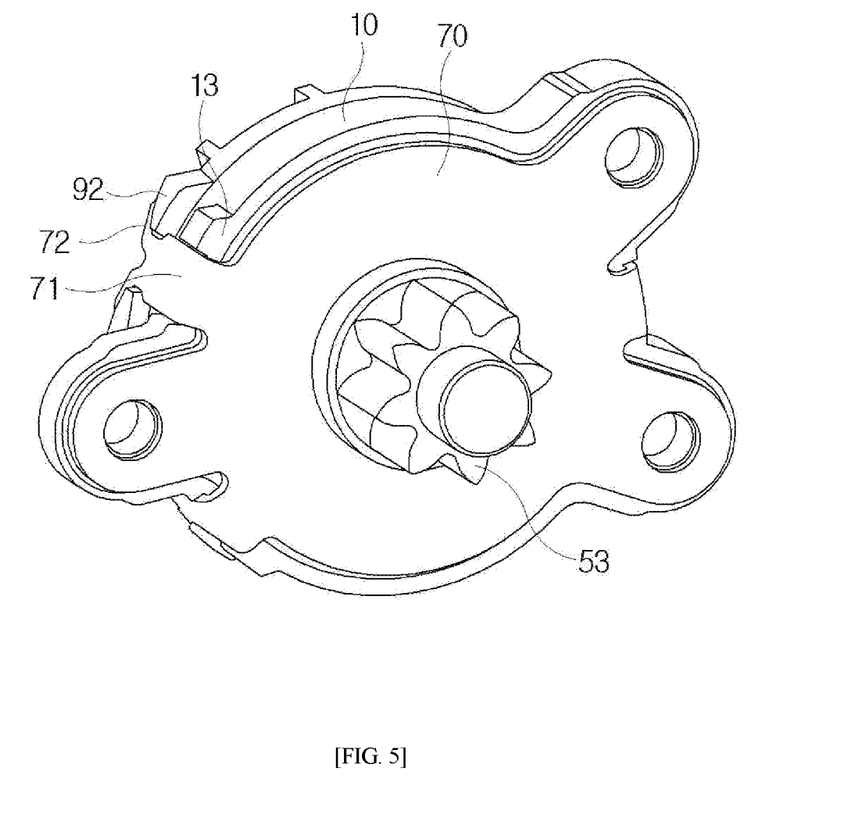
FIG. 5 is a rear perspective view of a seat brake device according to the present disclosure.

The front and rear perspective views of an endless brake device assembled as described above are shown in FIGS. 4 and 5.

A plurality of mounting portions 14, 42, 73 protruding outwardly in the radial direction are respectively formed on the housing 10, the brake ring 40, and the cover plate 70 at the same positions as each other, and the mounting portions 14, 42 and 73 are formed with bolt holes, which coincide with each other during assembly.

Therefore, the mounting portions 14, 42, 73 may be mounted to a cushion frame of a seat using bolts.

A pair of stopper protrusions 24 are formed on the input member 20, and the pair of stopper protrusions 24 are spaced apart from the center boss 21 by the same distance in the radial direction. The stopper protrusions 24 are formed in opposite directions with respect to the center boss 21.

The cover 90 has stopper holes 93 into which the stopper protrusions 24 are inserted. The stopper holes 93 are formed to have an arc shape with a predetermined length on the same circumference centering on the boss hole 91. Since the stopper protrusion 24 is movable only inside the stopper hole 93, a rotational angle of the input member 20 is limited within the range of the circumferential length of the stopper hole 93. That is, an operation range of the lever is limited within a predetermined range, and unnecessary excessive operation of the lever is prevented, and thus the forward movement and return movement of the unlock member 30 may be smoothly and stably made.

In addition, a tap hole 25 may be formed in the stopper protrusion 24, and the lever to be operated by an occupant may be bolted to the input member 20 using the tap hole 25.

On the other hand, the unlock protrusion 32 of the unlock member 30 is formed in the same number as the number of the braking members 60. An edge of an end of the unlock protrusion 32 may be formed to have an inclined surface 32a so as to be easily inserted between the rollers 62 on the both sides of the braking member 60 (see FIG. 6).

Figure 6:
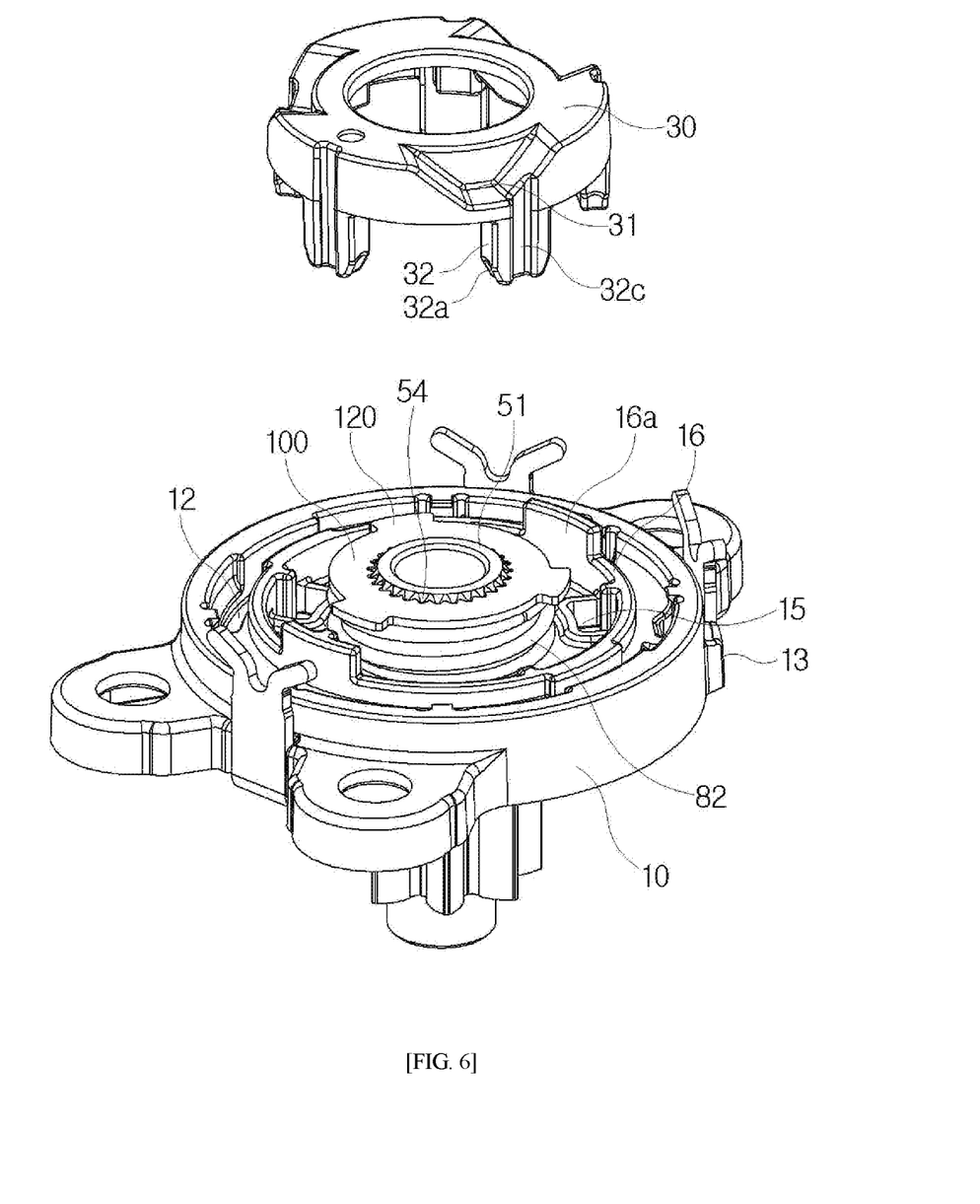
FIG. 6 is a perspective view of an assembled state of a tooth plate, which is a main component of the present disclosure.

In addition, as shown in FIG. 6, a straight guide groove 32c is formed in the outer surface of the unlock protrusion 32 along the operating direction of the unlock member 30. The guide groove 32c may be formed to pass through the entire body of the unlock member 30 in an upward and downward direction.

In correspondence to the guide groove 32c, a straight guide protrusion 16a is formed to protrude from the inner peripheral surface of an intermediate wall 16 of the housing 10 in the axial direction of the housing 10.

Figure 7:
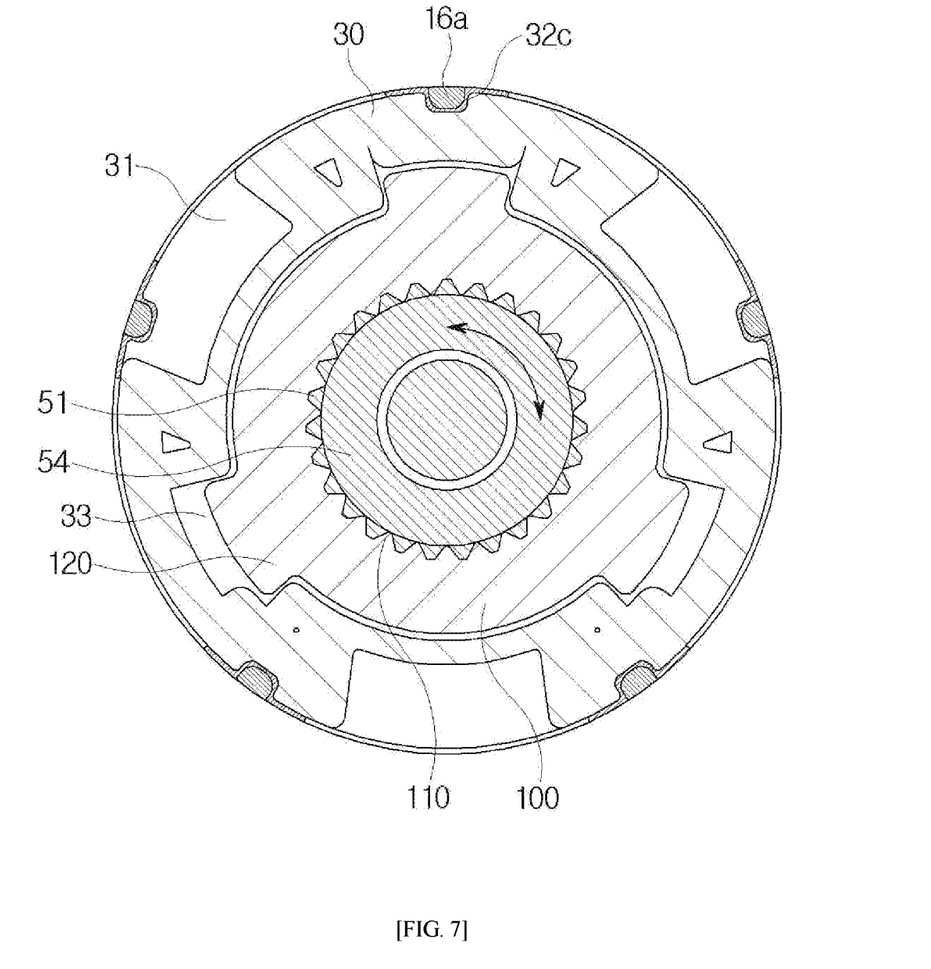
FIG. 7 is a cross-sectional view of the assembled state of the tooth plate.

In the assembled state, the guide protrusion 16a is inserted into the guide groove 32c of the unlock member 30 to guide the linear movement of the unlock member 30 (see FIG. 7).

Referring to FIG. 6, reference numeral 15 denotes a protrusion hole 15 through which the unlock protrusion 32 passes, and the unlock protrusion 32 may protrude through the protrusion hole 15 toward the rear surface of the housing 10 to enable operation of the braking member 60.

In addition, as shown in FIGS. 1 and 2, the present disclosure further includes the tooth plate 100. The tooth plate 100 is a disk-shaped member having a circular through hole formed therein, and is inserted into and installed in the unlock member 30.

As shown in FIGS. 6 and 7, the tooth plate 100 has serrated teeth 110 formed in the inner peripheral surface of the tooth plate 100, and correspondingly, serrated teeth 54 are also formed in the outer peripheral surface of one end of the shaft 51 of the pinion shaft 50. Since the serrated teeth 110 and the serrated teeth 54 are coupled to each other, the tooth plate 100 is coupled to the pinion shaft 50 such that the tooth plate 100 is unable to rotate with respect to the pinion shaft 50 and is able to axially move with respect to the pinion shaft 50.

In the assembled state, an upper surface of the tooth plate 100 is in contact with the upper surface of the inner space of the unlock member 30 as shown in FIG. 2, and the lower surface of the tooth plate 100 is supported on the second spring 82. In this state, the coupling between the teeth 110 and the teeth 54 is maintained.

On the other hand, a plurality of protrusions 120 are formed to protrude outward from the outer periphery of the tooth plate 100 in the radial direction and are formed at equal intervals. FIG. 7 shows a state in which three protrusions 120 are formed at intervals of 120°. The same number of holding grooves 33 are formed in the inner peripheral surface of the unlock member 30 in correspondence with the protrusions 120.

In the assembled state, the protrusions 120 are inserted into the corresponding holding grooves 33 and are held in the circumferential direction, so that the tooth plate 100 may be maintained in a stable assembly state in which the tooth plate 100 is unable to rotate with respect to the unlock member 30.

The operation and effect of the brake device according to the present disclosure will now be described.

When an occupant pulls up a lever located on the side of a seat, the input member 20 coupled to the lever is rotated, and the sliding protrusion of the input member 20 pushes the sliding groove 31 of the unlock member 30, so that the unlock member 30 moves axially toward the housing 10.

Therefore, the unlock protrusion 32 of the unlock member 30 protrudes to the inside of the brake ring 40 through the protrusion hole 15 of the housing 10. In this case, as the unlock protrusion 32 is inserted between the rollers 62 adjacent to each other in the braking member 60, the unlock protrusion 32 pushes the rollers 62 on both sides and moves the rollers 62 from the wedge surface 41a to the release surface 41b. Accordingly, the constrained state of the brake plate 52 caused by the rollers 62 is released, and the pinion shaft 50 is able to rotate freely, making it possible to adjust the height of the seat.

Conversely, when the occupant releases the pulled lever, the first spring 81 pushes the holding portion 22, the input member 20 returns to its original position and the second spring 82 pushes the unlock member 30, so that the unlock member 30 returns to its original position.

Therefore, the unlock protrusion 32 of the unlock member 30 exits between the rollers 62, and the rollers 62 are returned to their original positions by the spring 61 to move from the release surface 41b to the wedge surface 41a, thereby causing the pinion shaft 50 to be again unable to rotate. Accordingly, the rack operation of the seat height adjustment mechanism engaged with the pinion gear 53 is impossible, and thus the height of the seat is maintained in an adjusted state.

On the other hand, when an excessive load exceeding a braking force of the rollers 62 is continuously and repeatedly applied, a slip occurs between the roller 62 and the brake plate 52 to cause the rotation of the pinion shaft 50, thus resulting in seat sagging in which a decrease in the height of the seat cushion occurs.

However, according to the present disclosure, the rotation of the pinion shaft 50 is prevented by the tooth plate 100, thereby preventing seat sagging.

Figure 8:
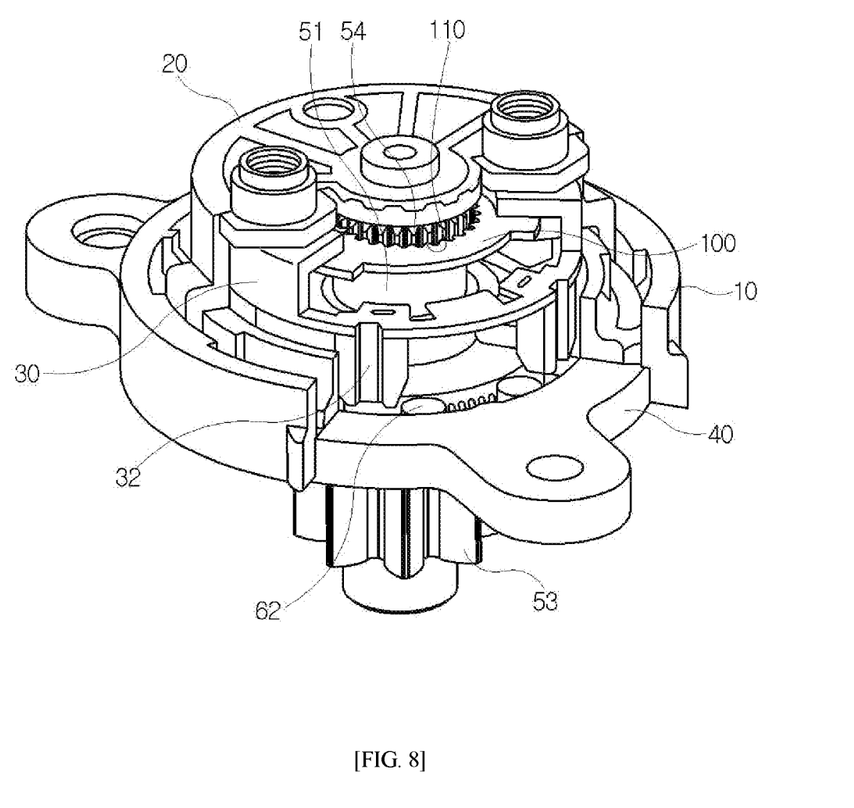

A state in which the braking action by the rollers 62 occurs is a normal state in which an occupant does not operate the lever, and is the same state as in FIGS. 2 and 8. In this state, the unlock member 30 has moved toward the cover 90 by the second spring 82. In this case, the tooth plate 100 is positioned on the same line with the teeth 54 of the pinion shaft 50, and the teeth 110 of the tooth plate 100 and the teeth 54 of the pinion shaft 50 are coupled to each other.

Since the housing 10 is fixed to the cushion frame, rotation of the unlock member 30 with respect to the housing 10 is constrained by the coupling between the guide protrusion 16a and the guide groove 32c, and rotation of the tooth plate 100 with respect to the unlock member 30 is constrained by the coupling between the protrusion 120 and the holding groove 33, the rotation of the pinion shaft 50 with respect to the tooth plate 100 is constrained by the coupling between the teeth 54 and the teeth 110.

That is, since the constrained state of the pinion shaft 50 is maintained by the tooth plate 100 even when the constrained state by the rollers 62 is weakened as described above, the rotation of the pinion shaft 50 is suppressed to prevent seat sagging.

Figure 9:
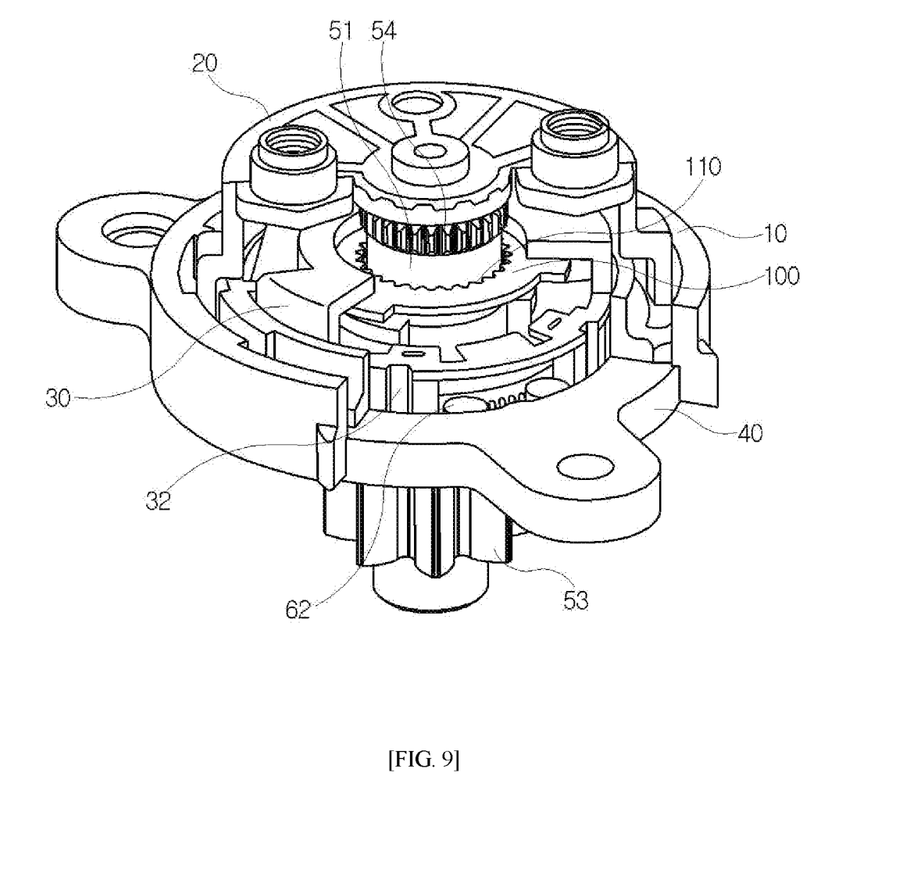

On the other hand, when the occupant operates the lever to adjust the seat height, the input member 20 is rotated and the unlock member 30 is moved toward the housing 10. In this case, since the tooth plate 100 is installed inside the unlock member 30, as shown in FIG. 9, the tooth plate 100 moves toward the housing 10 together with the unlock member 30 and therefore, the teeth 110 of the tooth plate 100 is separated from the teeth 54 of the pinion shaft 50.

Therefore, since the rotational constraint force by the tooth plate 100 does not work, and in this state, the rotational constraint by the rollers 62 is also released by the unlock protrusion 32, the pinion shaft 50 is able to rotate freely, thereby enabling the height of the seat to be adjusted normally.

That is, the tooth plate 100 more reliably suppresses the rotation of the pinion shaft 50 in a normal seat use state to prevent sagging of the seat. On the other hand, in the seat height adjustment state in which the occupant operates the lever, the tooth plate 100 is separated from the pinion shaft 50 and does not constrain the rotation of the tooth plate 100, resulting in no interfere with the seat height adjustment operation.

According to the present disclosure as described above, slip rotation does not occur in the pinion shaft by providing the tooth plate for constraining the pinion shaft in the rotational direction in the brake lock state even when the constraint force by the brake rollers is reduced, thereby preventing seat sagging.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. Accordingly, the scope and spirit of the present disclosure should be limited only by the following claims.

| REFERENCE NUMERALS | |
|---|---|
| 10: Housing | 11: Center Boss |
| 16: Intermediate Wall | 16a: Guide Protrusion |
| 20: Input Member | 21: Center Boss |
| 22: Holding Portion | 30: Unlock Member |
| 31: Sliding Groove | 21: Unlock Protrusion |
| 32c: Guide Groove | 33: Holding Groove |
| 40: Brake Ring | 41: Peripheral Surface |
| 50: Pinion Shaft | 51: Shaft |
| 52: Brake Plate | 53: Pinion Gear |
| 54: Teeth | 60: Braking Member |
| 61: Spring | 62: Roller |
| 70: Cover Plate | 71: Coupling Piece |
| 81: First Spring | 82: Second Spring |
| 90: Cover | 91: Boss Hole |
| 92: Holding Jaw | 100: Tooth Plate |
| 110: Teeth | 120: Protrusion |

What is claimed is:

1. A brake device for a vehicle seat comprising:
an input member connected to a lever to be operated by an occupant and rotating according to operation of the lever;
an unlock member configured to be pushed and moved in an axial direction by rotation of the input member;
a housing, the input member and the unlock member being installed on one side of the housing;
a brake ring mounted on the other side of the housing;
a pinion shaft rotatably installed in the housing through the brake ring;
a brake member installed between the brake ring and the pinion shaft and constraining the pinion shaft with respect to the brake ring or releasing constraint of the pinion shaft; and
a tooth plate installed in the unlock member and constraining rotation of the pinion shaft.

2. The brake device of claim 1, wherein teeth formed on an inner peripheral surface of the tooth plate are engaged with teeth formed on one end of the pinion shaft.

3. The brake device of claim 2, wherein the teeth of the tooth plate and the teeth of the pinion shaft are mutually constrained in a circumferential direction and are freely separated from each other in the axial direction.

4. The brake device of claim 3, wherein, when the lever is operated and the unlock member moves toward the housing by the input member, the tooth plate moves together with the unlock member, so that the teeth of the pinion shaft and the teeth of the tooth plate are separated from each other to enable the pinion shaft to rotate freely.

5. The brake device of claim 1, wherein the tooth plate is inserted into the unlock member, an upper surface of the tooth place is in close contact with an upper surface of an inner space of the unlock member, and a lower surface of the tooth place is supported in contact with a second spring that elastically supports the unlock member in an opposite direction of the housing.

6. The brake device of claim 1, wherein a plurality of protrusions is formed on an outer peripheral surface of the tooth plate, and the protrusions are inserted into holding grooves formed on an inner peripheral surface of the unlock member to constrain the tooth plate in a rotational direction with respect to the unlock member.

7. The brake device of claim 1, wherein a guide protrusion formed on an intermediate wall of the housing in the axial direction is inserted into a guide groove formed in an outer peripheral surface of the unlock member in the axial direction, so that the unlock member is constrained in a rotational direction with respect to the housing.

* * * * *